United States Patent [19]

Bartholomew

[11] Patent Number: 5,621,959

[45] Date of Patent: Apr. 22, 1997

[54] METHOD OF ATTACHING A BEAD ASSEMBLY TO A TUBULAR CONDUIT

[75] Inventor: Donald D. Bartholomew, Mt. Clemens, Mich.

[73] Assignee: Proprietary Technology, Inc., Bloomfield Hills, Mich.

[21] Appl. No.: 295,916

[22] PCT Filed: Mar. 31, 1992

[86] PCT No.: PCT/US92/02511

§ 371 Date: Sep. 14, 1994

§ 102(e) Date: Sep. 14, 1994

[87] PCT Pub. No.: WO93/20377

PCT Pub. Date: Oct. 14, 1993

[51] Int. Cl.$^6$ .................................................. B23P 11/00
[52] U.S. Cl. .............................. 29/450; 29/451; 138/109
[58] Field of Search ........................... 29/229, 450, 451, 29/505, 515, 516; 138/103, 109, 110, 172, 174; 285/379, 415, 419

[56] References Cited

U.S. PATENT DOCUMENTS

| | | |
|---|---|---|
| 1,320,430 | 11/1919 | Wheeler . |
| 1,381,244 | 6/1921 | Shallenberger . |
| 1,988,595 | 1/1935 | Hiss . |
| 2,155,584 | 4/1939 | Bryant et al. . |
| 2,741,497 | 4/1956 | Risley . |
| 2,832,130 | 4/1958 | Harvey . |
| 2,886,355 | 5/1959 | Wurzel . |
| 3,389,923 | 6/1968 | Love, Jr. et al. . |
| 3,520,047 | 7/1970 | Muhlner et al. ............... 29/451 X |
| 3,729,217 | 4/1973 | Metcalf . |
| 4,199,853 | 4/1980 | Fricker . |
| 4,303,262 | 12/1981 | Pierrel et al. . |
| 4,431,218 | 2/1984 | Paul, Jr. et al. ............... 29/451 X |
| 4,524,505 | 6/1985 | Conner ........................... 29/229 X |
| 4,629,220 | 12/1986 | Crusco . |
| 4,744,132 | 5/1988 | Greene et al. ................. 29/229 X |
| 4,778,203 | 10/1988 | Bartholomew . |
| 4,948,176 | 8/1990 | Bartholomew . |
| 5,110,161 | 5/1992 | Bartholomew . |
| 5,212,859 | 5/1993 | Hagerty ............................... 29/229 |

Primary Examiner—S. Thomas Hughes
Attorney, Agent, or Firm—Harness, Dickey & Pierce

[57] ABSTRACT

Snap-on bead assemblies for providing blocking walls for the attachment of connectors, and more particularly quick connectors, are disclosed as comprising an open-ended ring member having an outer surface, an inner surface and two extending flanges. The ring members are formed of a resilient material, such as high gauge steel, which allows the ring members to be expanded and positioned over a tubular conduit. In a first embodiment, the flanges (16a) and (16b) project downwardly and embed within depressions (34) formed upon outer surface (32) of the conduit (30) to lock the ring member (10) onto the conduit. In the second embodiment, the flanges (116a) and (116b) project upwardly and the inner surface (112) of the ring member (110) is positioned within a depression (134) formed on the surface (132) of the conduit (130) which locks the ring member (110) onto the conduit (130).

10 Claims, 2 Drawing Sheets

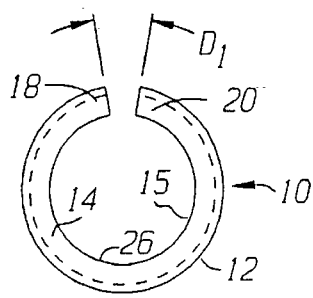
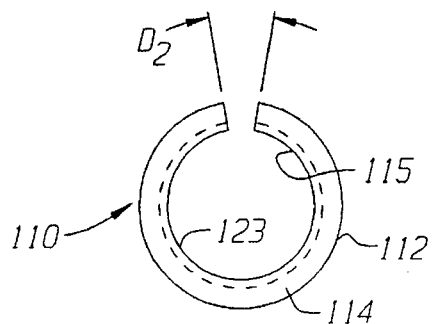
FIG 1  FIG 6
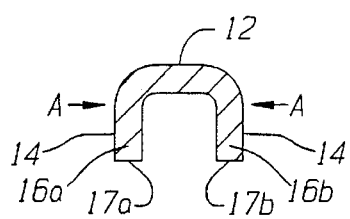
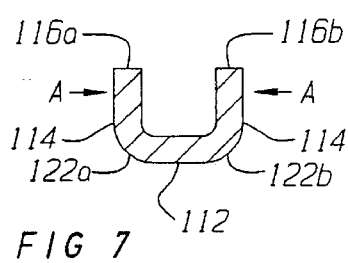
FIG 2  FIG 7
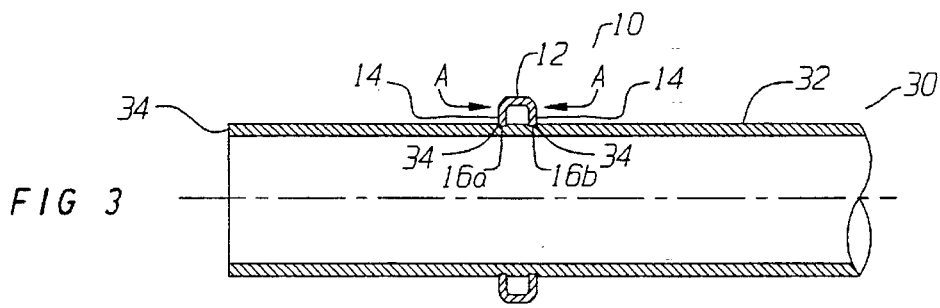
FIG 3
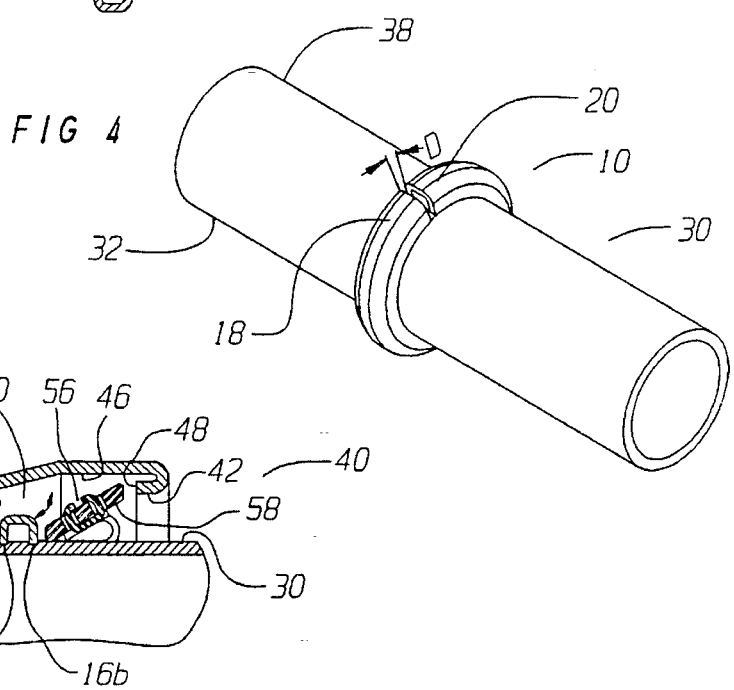
FIG 4
FIG 5

METHOD OF ATTACHING A BEAD ASSEMBLY TO A TUBULAR CONDUIT

BACKGROUND OF THE INVENTION

1. Field of the Invention

This invention relates to bead assemblies, and more particularly, to bead assemblies which are attachable to tubular conduits and which provide the conduits with blocking walls for abutment by connector assemblies.

2. Description of Related Art

In the automotive industry, as well as for many other industries, the need always exist for low cost, reliable and easy to assembly components. This need is especially true with respect to connector assemblies which detachably join fluid conveying conduits, such as fuel or refrigerant lines. Presently, many connector assemblies, and more particularly, many quick connector assemblies, are manufactured such that a male conduit is provided with an outwardly projecting bead for abutment by retainer means contained within a female housing. The connection between fluid conveying conduits is generally made by inserting the male conduit into the female housing until the snap connection occurs thereby locking the male conduit within the female housing. Many times, however, tubular conduits already placed in use are not provided with this upwardly projecting bead member. Standard beadless conduits must, therefore, be provided with a bead member before they can be utilized with many connector assemblies. The embodiments of the present invention fulfill this need by providing apparatuses which are attachable to standard tubular conduits thereby converting the standard conduit to a form which can be utilized with connector assemblies and, more particularly, with quick connector assemblies.

Accordingly, it is the primary object of the present invention to provide a standard conduit with an attachable bead member thereby adapting the conduit into one that can be utilized with a connector assembly and, particularly, with a quick connector assembly.

It is another object of the present invention to provide an attachable bead assembly which can be attached to a tubular conduit quickly and easily.

It is yet another object of the present invention to provide attachable bead assemblies which can be used on tubular conduits which are resistant to welding and gluing.

It is also an object of the present invention to provide bead assemblies which are producible at a low cost.

SUMMARY OF THE INVENTION

To achieve the foregoing objects of the present invention, bead assemblies for attachment to fluid conveying conduits are provided which assist in facilitating the connection of two or more fluid conveying conduits. A first bead assembly embodiment generally comprises an open ended ring member having an outer surface, an inner surface and two flanges which extend downwardly toward the center of the ring member. The ring member is formed of a resilient material which allows the ring member to be pried open and positioned upon the conduit. Once the ring member is positioned over the conduit, the prying tool is disengaged from the ring member allowing the ring member to spring back into a substantially closed position. The ends of the inwardly extending flanges are embedded in the outer surface of the tubular conduit to prevent lateral movement of the ring member once positioned over the conduit. The flanges provide blocking walls which assist in locking a female housing over the conduit.

A second bead assembly embodiment generally comprises an open ended ring member having an outer surface, an inner surface and two flanges which extend upwardly away from the center of the ring member. Again, the ring member is formed of a resilient material which allows the ring member to be pried open and positioned upon the conduit. The outwardly extending flanges of this second embodiment provide abutment surfaces which assist in locking a female housing over the conduit.

In both embodiments, the ring member is constructed so as to return to a closed position after being positioned upon the conduit. The engagement force of the ring member is limited by design. The ring members can only close to the point where the two ends come into abutment. The ring members would otherwise overly deform the conduit thereby limiting fluid flow.

Additional objects and advantages of the present invention will become apparent from reading the detailed description of the preferred embodiments which make reference to the following set of drawings.

BRIEF DESCRIPTION OF THE DRAWINGS

FIG. 1 is a front view of a first embodiment of the present invention.

FIG. 2 is a partial cross-sectional end view of the embodiment of FIG. 1.

FIG. 3 is a partial cross-sectional view showing the embodiment of FIG. 1 attached to a conduit.

FIG. 4 is a perspective view of the connection shown in FIG. 3.

FIG. 5 is a partial cross-sectional view showing the embodiment of FIG. 1 in a quick connect relationship.

FIG. 6 is a front view of a second embodiment of the present invention.

FIG. 7 is a partial cross-sectional end view of the embodiment of FIG. 6.

DETAILED DESCRIPTION OF THE PREFERRED EMBODIMENTS

Figure 8:
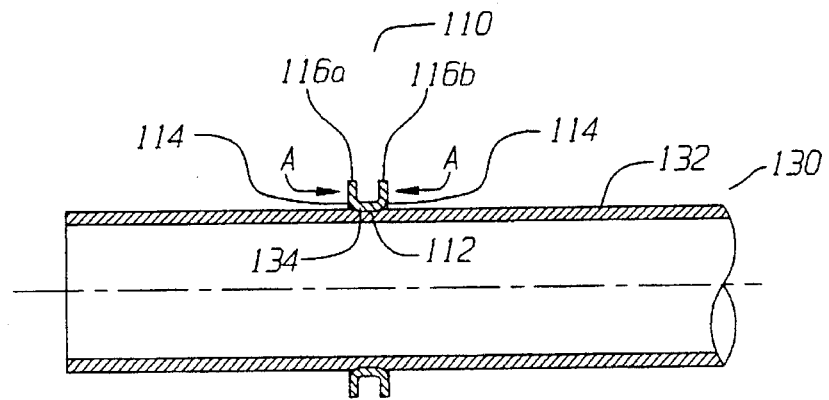
FIG. 8 is a partially cross-sectional view showing the embodiment of FIG. 6 attached to a conduit.

Referring to FIGS. 1 and 2 a frontal view and a cross-sectional end view of a first embodiment of the present invention are provided. This first embodiment comprises an open ended, substantially rounded ring member 10 which includes an outer surface 12, a radial surface 14, a center 15 and two flanges 16a and 16b which extend downwardly toward the center 15 of the ring member 10. The flanges 16a and 16b define inner surfaces 17a and 17b. The ring member 10 also includes two ends 18 and 20. The ring member 10 is typically manufactured such that the ends 18 and 20 naturally abut. The ring member 10 is formed of a highly resilient material, such as high gauge steel, which imparts springy characteristics and allows the ring member 10 to be selectively deformed. The ring member 10 defines an inner diameter 26.

Referring to FIGS. 3 and 4, a partial cross-sectional view and a perspective view of the first embodiment of the present invention are provided showing the ring member 10 engaging the tubular conduit 30. The conduit 30 defines an outer diameter 32, to position the ring member 10 upon the conduit 30 a prying tool (not shown) is inserted between the ends 18 and 20 and is rotated such that the ends are forced apart. As the ends are separated, the inside diameter 26 of the ring member 10 becomes larger. This prying action is continued until the inside diameter 26 of the ring member 10 becomes greater than the outer diameter 32 of the conduit 30 upon which the ring member 10 is to be mounted. The ring member 10 is then slid over the conduit and positioned for attachment.

The conduit may be made of various different materials such as metal or plastic. Metal conduits generally must be formed with a pair of annular grooves 34 prior to attaching the ring member 10. The grooves are typically provided at the time the tubular conduit 30 is manufactured, although it is contemplated that grooves can be formed into the conduit with a device such as a modified pipe cutting tool (not shown) some time after the manufacturing of the conduit and prior to attachment of ring member 10. To attach ring member 10 the inner surfaces a 17a and 17b are aligned directly over the grooves 34 and the prying tool (not shown) is removed. Removal of the prying tool causes the ring member 10 to spring back towards its original position such that the ends 18 and 20 approach each other. Ideally, the diameter of the conduit within grooves 34 will be approximately equal to the diameter along the inner surfaces 17a and 17b when the ring member 10 is closed, thereby allowing the ends 18 and 20 to abut. The inner surfaces 17a and 17b fit securely within the grooves 34 to preclude lateral movement of the ring member 10 along the conduit 30.

With tubular conduits formed of plastic many times it is not necessary to supply the conduit with preformed annular grooves 34. The force created by the ring member 10 as it springs back toward the closed position is sufficiently great so as to cause the inner surfaces 17a and 17b to become embedded within the outer diameter of the tubular conduit. Once the inner surfaces 17a and 17b have been embedded within the outer diameter 32 of the tubular conduit 30, the tubular conduit can then be utilized with a connector assembly.

Referring to FIG. 5 a partial cross-sectional view showing the first embodiment of the present invention as used in a quick-connect relationship is provided. After the ring member 10 has been positioned upon the tubular conduit 30, the tubular conduit is inserted into a the female housing 40 to facilitate connection of the two fluid conveying conduits. In the present example, a leading end 35 of the tubular conduit 30 is inserted into a the reduced diameter portion 42 of the female housing 40. A sealing ring 50 and bushings 52 and 54 are provided to limit the insertion forces on the connector assembly. A retainer member 56 is disposed within an enlarged diameter portion 46 of the female housing 40 to assist in selectively locking the tubular conduit 30 within the female housing 40. The retainer member 56 is provided with blocking plates 58 which abut 9 flange 48 of female housing 40 at one end and the flange 16b of the ring member 10 at the other end. This abutment of the first flange 16a by blocking plates 58 occurs when the flange 16a abuts a blocking wall 60.

Referring to FIGS. 6 and 7 a frontal view and a cross-sectional end view of a second embodiment of the present invention is disclosed as comprising an open ended, substantially rounded ring member having an inner surface 112, a radial surface 114, a center 115, and two flanges 116a and 116b which extend upwardly away from the center 115 of ring member 110. Again this ring member 110 is typically manufactured such that the ends 118 and 120 naturally abut. Between the inner surface 112 and the radial surfaces 114 are curved surfaces 122a and 122b which, combined with the inner surface 112, limit the force exerted on the conduit (not shown). The inner surface 112 defines an inner diameter 123. The ring member 110 is formed of a highly resilient material, such as high gauge steel, which imparts springy characteristics and allows the ring member 110 to be selectively deformed.

Figure 9:
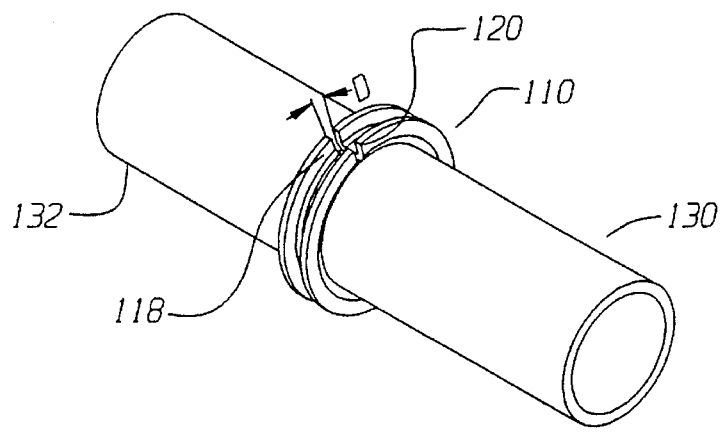
FIG. 9 is a perspective view of the connection shown in FIG. 8.

Referring to FIGS. 8 and 9 a partial cross-sectional view and a perspective view of the second embodiment of the present invention are provided showing the ring member 110 engaging a tubular conduit 130 having an outer diameter 132. To position the ring member 110 upon the conduit 130 prying tool (not shown) is inserted between the ends 118 and 120 and is rotated such that the ends 118 and 120 are forced apart. As the ends are separated the inner diameter 123 of the ring member 110 becomes larger. This prying action is continued until the inner diameter 123 of the ring member 110 becomes greater than the outer diameter 132 of the conduit 130. The ring member 110 is then slid over the conduit 130 and positioned for attachment. Again the tubular conduit 130 may be made of various different materials such as metal or plastic. The metal conduits are generally formed with an annular groove 134 substantially equal in width to the width of the ring member 110 to be attached. The groove 134 can be provided at the time the conduit 130 is manufactured or at a later time by using a modified pipe cutting tool (not shown). To attach the ring member 110 the inner surface 112 is aligned directly over the groove 134 and the prying tool (not shown) is removed. Removal of the prying tool causes the ring member 110 to spring back towards its original position such that the inner surface 112 engages the outer diameter of the groove 134. Ideally, the outer diameter of the conduit within the groove 134 will be approximately equal to the inner diameter of the inner surface 112 when the ring member 110 is closed and the ends 118 and 120 abut. Often with tubular conduits formed of soft plastic it is not necessary to supply the conduit with a preformed annular groove 134. The force created by the ring member 110 as it springs back: toward the closed position is sufficiently great to cause the inner surface 112 to become embedded within the outer diameter of the soft plastic tubular conduit.

Figure 10:
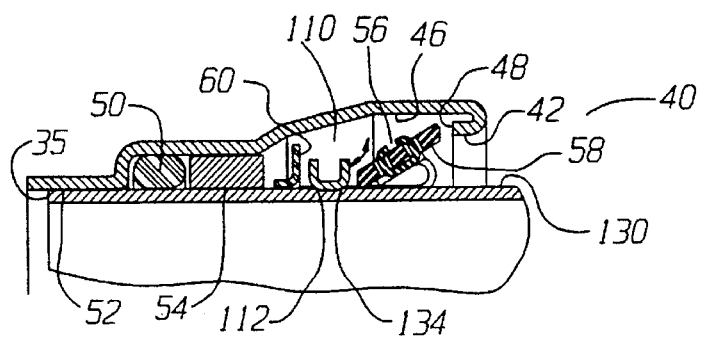
FIG. 10 is a partial cross-sectional view showing the embodiment of FIG. 6 in a quick connect relationship.

A partial cross-sectional view showing the second embodiment of the present invention as used in a quick connect relationship is provided in FIG. 10. The tubular conduit 130 having ring member 110 attached thereto is inserted into the female housing 40 to facilitate connection of the two fluid conveying conduits as previously described with reference to FIG. 5.

It will be understood by those skilled in the art that the bead assemblies of the present invention may be utilized with a variety of connector and quick connector assemblies. While the above description constitutes the preferred embodiments of the present invention, it will be appreciated that the invention is susceptible to modification, variation and change without departing from the proper scope and fair meaning of the accompanying claims.

What is claimed is:

1. A method of attaching a bead assembly to a tubular conduit, the method comprising the steps of:

(a) providing a selectively deformable ring member having a first end and a second end, an inner surface, an outer surface, an axially tubular portion, and a pair of spaced apart radially projecting flanges having said tubular portion fitted therebetween, said ring member having a desired inner diameter in an undeformed condition;

(b) providing a tubular conduit having an outer diameter and at least one annular groove;

(c) expanding said ring member such that the ring member's inner diameter increases to a size greater than the tubular conduit's outer diameter by inserting a tool between said first and second ends;

(d) positioning said ring member over said tubular conduit; and (e) removing said tool from between said first and second ends, whereby removing said tool from between said first and second ends allows said ring member to spring back to its original position and said ring member after assembly on said tubular conduit returning to its undeformed inner diameter such that said inner diameter is less than said tubular conduit outer diameter to attach said ring member to said tubular conduit.

2. The method of claim 1, wherein said flanges extend downwardly toward said tubular conduit.

3. The method of claim 2, wherein said flanges become embedded within an annular groove to preclude lateral movement of said ring member along said conduit.

4. The method of claim 1, wherein said flanges extend upwardly away from said conduit.

5. The method of claim 4, wherein the inner surface of said ring member becomes embedded within an annular groove to preclude lateral movement of said ring member along said conduit.

6. A method of attaching a bead assembly to a tubular conduit, the method comprising the steps of:

(a) providing a selectively deformable ring member having a first end and a second end, an inner surface and an outer surface and at least one projecting flange, said ring member having a desired inner diameter in an undeformed condition;

(b) providing a deformable tubular conduit formed from a plastic;

(c) expanding said ring member such that the ring's inner diameter increases to a size greater than the tubular conduit's outer diameter by inserting a tool between said first and second ends;

(d) positioning said ring member over said tubular conduit; and (e) removing said tool from between said first and second ends, whereby removing said tool from between said first and second ends allows said ring member to spring back to its original position and be embedded within the outer diameter of said tubular conduit and said ring member after assembly on said tubular conduit returning to its undeformed inner diameter such that said inner diameter is less than said tubular conduit outer diameter to attach said ring member to said tubular conduit.

7. The method of claim 6, wherein said at least one flange extends downwardly toward said tubular conduit.

8. The method of claim 7, wherein said at least one flange becomes embedded within the outer surface of said tubular conduit to form annular groove and thereby preclude lateral movement of said ring member along said conduit.

9. The method of claim 6, wherein said at least one flange extends upwardly away from said tubular conduit.

10. The method of claim 9, wherein the inner surface of said ring member becomes embedded within the outer surface of said tubular conduit thereby forming an annular groove and precluding lateral movement of said ring member along said tubular conduit.

* * * * *